United States Patent [19]

Obata et al.

[11] 4,203,606
[45] May 20, 1980

[54] PICKUP ARM DEVICE

[75] Inventors: Shuichi Obata, Kyoto; Takayuki Sugihara, Hirakata, both of Japan

[73] Assignee: Matsushita Electric Industrial Co., Ltd., Osaka, Japan

[21] Appl. No.: 957,312

[22] Filed: Nov. 3, 1978

[30] Foreign Application Priority Data

Nov. 17, 1977 [JP] Japan .................. 52-155194[U]

[51] Int. Cl.² ........................................... G11B 3/10
[52] U.S. Cl. ............................................ 274/23 R
[58] Field of Search ................................ 274/23 R

[56] References Cited

U.S. PATENT DOCUMENTS

| 3,378,267 | 4/1968 | Davis | 274/23 R |
|---|---|---|---|
| 4,066,267 | 1/1978 | Kagata | 274/23 R |

FOREIGN PATENT DOCUMENTS

| 997317 | 7/1965 | United Kingdom | 274/23 P |
| 1181361 | 2/1970 | United Kingdom | 274/23 R |

*Primary Examiner*—Harry N. Haroian
*Attorney, Agent, or Firm*—Burgess, Ryan and Wayne

[57] ABSTRACT

One end of an arm main body is formed integral with a head shell for mounting a cartridge while the other end thereof supports a balance weight. A mounting portion is formed integral with the arm main body between the ends thereof and close to the other end thereof. The mounting portion of the arm main body may be detachably mounted on an inner gimbal which in turn is mounted with pivot bearings to an outer gimbal for rotation about a horizontal axis so as to permit the arm main body to nod up and down. The outer gimbal in turn is mounted with pivot bearings to a yoke for rotation about a vertical axis so as to permit the arm main body to rotate in a horizontal plane. The yoke in turn is securely attached to the base of the pickup arm device.

3 Claims, 8 Drawing Figures

PICKUP ARM DEVICE

BACKGROUND OF THE INVENTION

The present invention relates to a pickup arm device.

In a prior art pickup device, one end of an arm is securely attached to a rotary mount while the other end is connected with coupling means such as a lock nut to a head shell which is fabricated separately from the arm. A weight shaft is extended from the rotary mount in the direction opposite to that of the arm and carries a balance weight which may be displaced in the axial direction of the supporting shaft in either direction. The rotary mount is mounted with pivot bearings to a rotary shaft in such a way that the mount may nod up and down. The rotary shaft in turn is mounted on a base in such a way that the shaft may rotate about a vertical axis. Thus the pickup arm may nod up and down and rotate in a horizontal plane.

With the pickup arm device of the type described, there has been some attempt to reduce the weight of the arm main body and the head shell in order to improve the reproduction characteristcs. However, since the head shell and the coupling means for connecting the head shell to the arm main body are located at the free end of the arm main body, reduction in effective mass of the whole pickup arm device to a satisfactory degree cannot be attained. Thus the satisfactory improvements of reproduction characteristics cannot be obtained. Furthermore because of the coupling means which must be specially designed and fabricated, the pickup arm device becomes expensive.

In order to overcome the above problems, it has been proposed to form a head shell integral with an arm main body or to attach the head shell to the arm main body with set screws and to attach the other end of the arm main body to a rotary mount with coupling means such as a lock nut. With this arrangement, the adverse effect of the weight of the coupling means on the effective mass of the whole pickup arm device may be minimized to some extent. That is, when the head shell is formed integral with the arm main body, the coupling means between them may be eliminated, whereby the pickup arm device may be made light in weight and fabricated at less cost. Furthermore, a desired arm may be selected and mounted. For instance, instead of an arm made of a aluminum alloy, an arm made of carbon fibers may be used so as to attain desired effects. Thus the pickup arm device may be upgraded. However, this arrangement has a disadvantage in that the coupling means between the arm main body and the rotary mount is loosened, resulting in resonance of the arm main body which adversely affects the reproduction characteristics.

One remedy to the above problems is to securely connect the arm main body to the rotary mount, thereby eliminating the coupling means. Then only the replacement of a cartridge is permitted. The arm and the head shell cannot be replaced so that quality of reproduction cannot be varied as desired. Furthermore the replacement of the pickup arm becomes very difficult. That is, the lead wires from the cartridge must be removed and then the whole pickup arm device must be removed from the cabinet. In case of an automatic record player, an automatic mechanism is coupled to the rotary shaft of the pickup arm device so that the replacement of the latter is almost impossible.

SUMMARY OF THE INVENTION

Accordingly, one of the objects of the present invention is to provide a pickup arm device which is very simple in construction and is inexpensive to fabricate and in which an arm having a mass which may result in an optimum compliance of a pickup cartridge may be detachably mounted on a gimbal.

A pickup arm device in accordance with the present invention is characterized by the provision of a rotary or gimbal bearing mounted on a record player, and an arm main body detachably mounted on an inner gimbal of said gimbal bearing, one end of said main body teminating into a cartridge mounting head shell while the other end thereof supporting a balance weight, a mounting portion, which is adapted to be detachably mounted on said inner gimbal, being formed integral with the arm main body between the ends thereof and closer to the other end thereof.

DESCRIPTION OF THE PREFERRED EMBODIMENT

Figure 1:
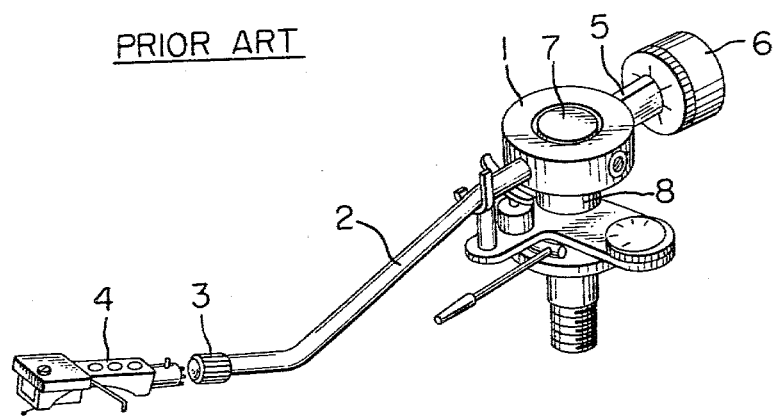
FIGS. 1 and 2 are perspective views, respectively, of prior art pickup arm devices.
Figure 2:
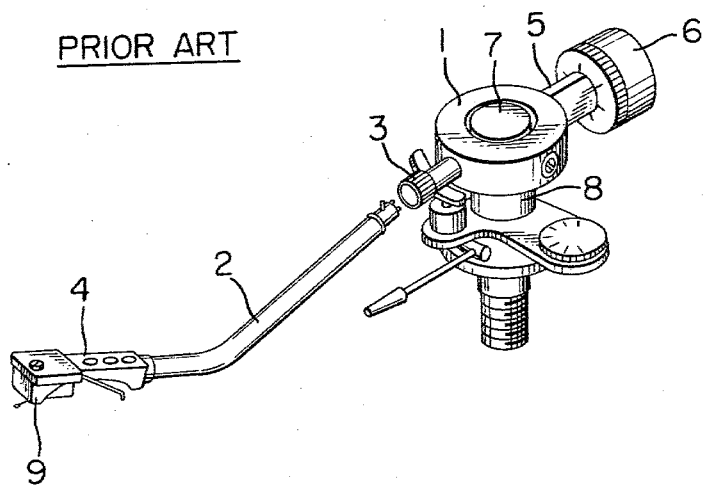

Prior Art, FIGS. 1 and 2

Referring to FIG. 1, a pickup arm 2 is mounted securely to a rotary mount 1. A head shell 4 for mounting a cartridge is attached with a lock nut 3 to the free end of the pickup arm 2. A weight supporting shaft 5 made of plastic is attached to the mount 1 in a diametrically opposite relationship with the pickup arm 2. A balance weight 6 is mounted on the supporting shaft 5 in such a way that the weight 6 may be slidable axially of the shaft 5. The rotary mount 1 is mounted to a rotary shaft 7 with pivot bearings in such a way that the mount 1 may nod up and down. The rotary shaft 7 is in turn mounted to a base 8 so as to be rotatable about its axis. Thus the pickup arm 2 may be permitted to nod up and down and rotate about the axis of the shaft 7.

With the prior art pickup arm device of the above construction attempts have been made to improve the pickup characteristics by reducing the weight of the arm 2 and the head shell 4 as much as possible. However, since the head shell 4, which is relatively heavy in weight, is detachably attached with the lock nut 3 to the free end of the arm 2, the overall effective mass of the pickup arm device cannot be reduced to a desired degree so that the satisfactory improvements of the pickup characteristics may not be attained. Furthermore the cost is expensive because of the additional cost of the lock nut 3 which must be specially designed and fabricated.

In order to overcome the above problems, there has been devised and demonstrated a pickup arm device of the type shown in FIG. 2. The head shell 4 is formed integral with the pickup arm 2 at one end thereof or is securely attached with set screws or the like to the arm 2. The other end of the arm 2 is connected to the rotary mount 1 with the lock nut 3. This arrangement is advantageous in that since the lock nut 3 is located close to the rotary mount 1, the adverse affect of the lock nut 3 on the effective mass of the pickup arm device may be minimized. More particularly, since the head shell 4 is formed integral with the arm 2, no coupling means is required between them so that the pickup arm device becomes light in weight and low in cost. Furthermore, the pickup arm 2 itself may be detached from the rotary mount 1 so that the pickup arm 2 made of aluminum alloy may be replaced with a pickup arm made of carbon fibers so as to improve the pickup characteristics. However, the pickup arm 2 must be connected to the mount 1 with the coupling means 3 so that a long use of the pickup arm results in loosening of the coupling means 3, causing the undesired resonance of the pickup arm 2 which seriously affects the reproduction characteristics.

The only solution to the above problems is to rigidly fix the other end of the pickup arm 2 to the rotary mount 1 so as to eliminate the use of coupling means 3. However with this arrangement only the cartridge 9 may be replaced and the arm 2 and the head shell 4 cannot be replaced. As a result, the improvement of the reproduction characteristics or the attempt to vary the quality of sound reproduced by the replacement of the arm 2 and the head shell 4 is very narrowly limited.

When the pickup cartridge 9 is formed integral with the head shell 4, the replacement of the pickup arm 2 becomes very difficult. That is, first the output leads must be removed and then the whole pickup arm device must be removed from the cabinet of a record player. In the case of the automatic record player, the rotary shaft 7 is associated with the disk changing mechanism so that the replacement of the pickup arm device is almost impossible.

Figure 3:
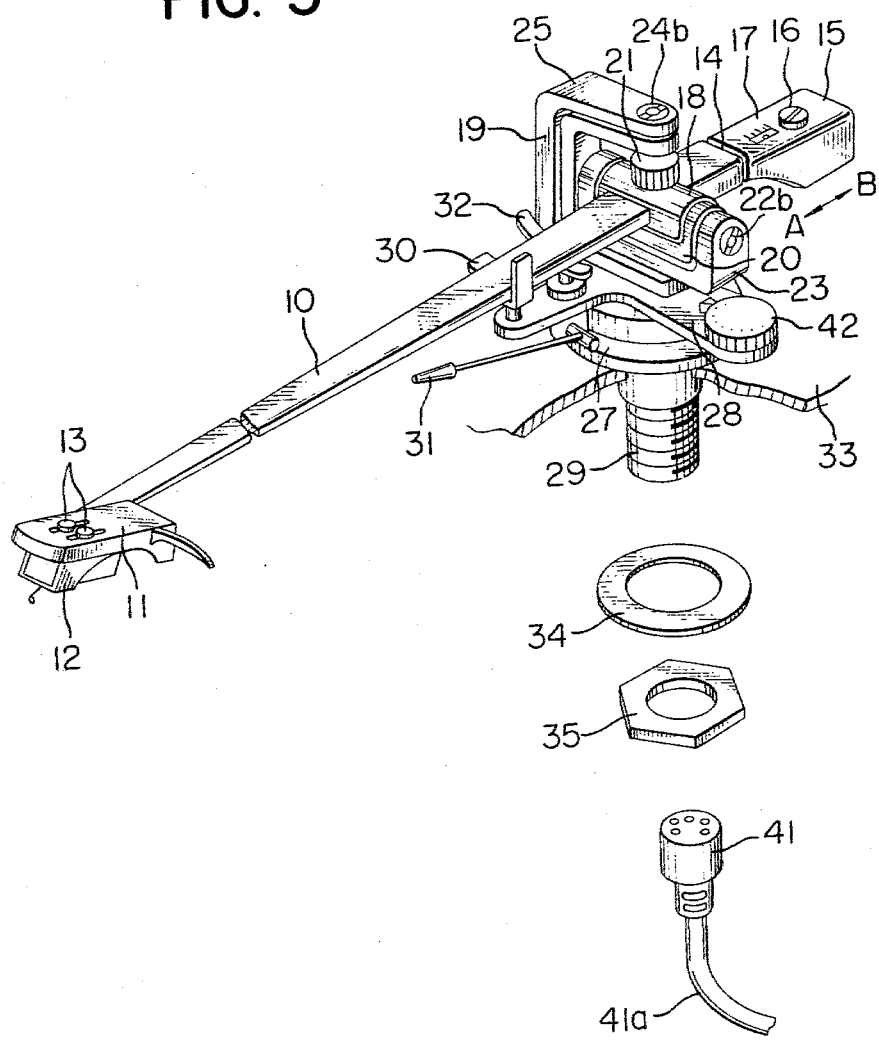
FIG. 3 is a perspective view of a pickup arm device in accordance with the present invention.
Figure 4:
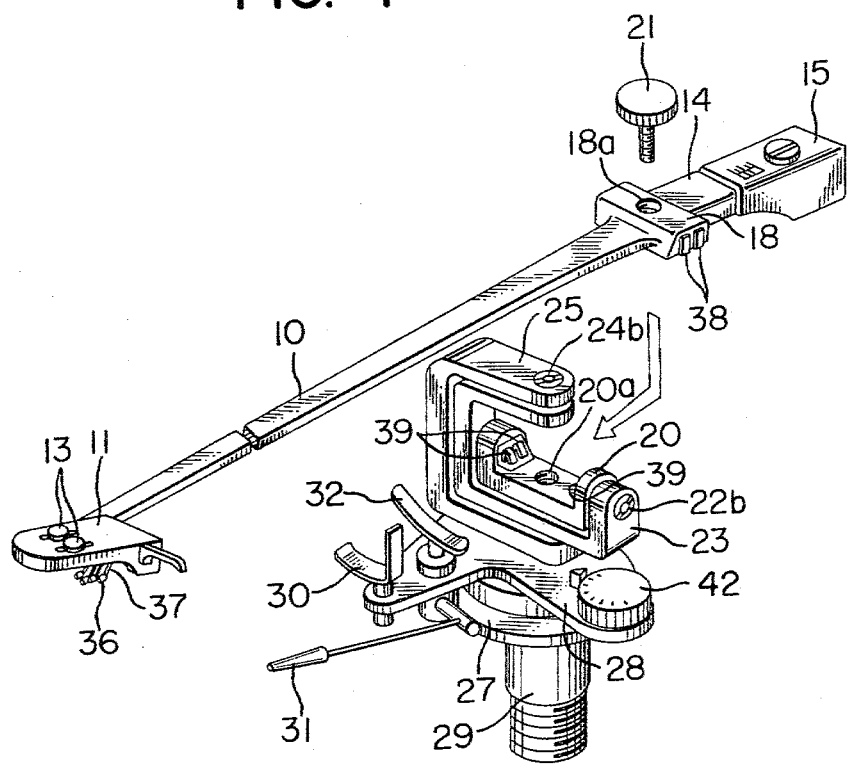
FIG. 4 is an exploded perspective view thereof.

The Invention, FIGS. 3, 4 and 5

The preferred embodiment of a pickup arm device in accordance with the present invention will be described in detail with reference to FIGS. 3–5. A pickup cartridge 12 is securely but detachably attached with screws 13 to a head shell 11 formed integral with one end of a pickup arm main body 10 while a balance weight 15 is mounted on the other end or the weight mounting portion 14 of the arm main body 10 in such a way that the weight 16 may be displaced in both the directions A and B (See FIG. 3). This is done by loosening a screw 16, displacing the balance weight 15 to a desired position and tightening the screw 16. The balance weight 15 is provided with a stylus pressure indicator 17. The arm main body 10 is further formed with a mounting portion 18 between the ends thereof and adjacent to the other end 14 thereof. The mounting portion 18 is extended laterally at right angles to the axis of the arm main body 10 and is adapted to be mounted on a U-shaped inner supporting frame or an inner gimbal 20 of a rotary or gimbal bearing generally indicated by the reference numeral 19. More particularly, the mounting portion 18 of the arm main body 10 is mounted on the inner supporting frame or the inner gimbal 20 and securely attached thereto with a set screw 21 screwed into a tapped hole 20a of the inner supporting frame or the inner gimbal 20 through the center hole 18a of the mounting portion 18 in such a way that the axis of the set screw 21 may coincide with the vertical axis of rotation of the rotary or gimbal bearing 19.

The construction of the rotary or gimbal bearing 19 is shown in detail in FIG. 5. The rotary or gimbal bearing 19 comprises in general the inner supporting frame or the inner gimbal 20 mounted with pivot bearings 22 to an outer supporting frame or an outer gimbal 23 in such a way that the inner supporting frame or the inner gimbal 20 may nod up and down. The outer supporting frame or the outer gimbal 23 is in turn mounted with pivot bearings 24 to a stationary supporting frame or a yoke 25 in such a way that the outer supporting frame or the outer gimbal 23 may rotate about the vertical axis described above. The stationary supporting frame or the yoke 25 in turn is securely attached to a base 27 in such a way that a through hole 26a formed through the lower arm of the stationary supporting frame or the yoke 25 may be in line with a through hole 26b of the base 27. The base 27 includes a base plate 28 and a threaded shank 29 both of which are formed integral with the main body of the base 27. As shown in FIGS. 3 and 4, mounted on the base plate 28 are an arm rest 30, an arm lifter 32 which is operable with a cueing lever 31 and an anti-skating mechanism which is adjustable with a knob 42. The shank 29 is inserted through a hole into a cabinet 33 and is securely attached thereto with a washer 34 and a nut 35. Thus the pickup arm device may be securely mounted on the cabinet 33.

Referring back to FIGS. 5(B) and (C), the pivot bearings 22 and 24 with which the inner supporting frame or the inner gimbal 20 and the outer supporting frame or the outer gimbal 23 are mounted to the outer supporting frame or the outer gimbal 23 and to the stationary supporting frame or the yoke 25, respectively, consist of balls 22a and 24a and pivot pins 22b and 24b with the pointed ends supported by the balls 22a and 24a as shown.

Figure 5A:
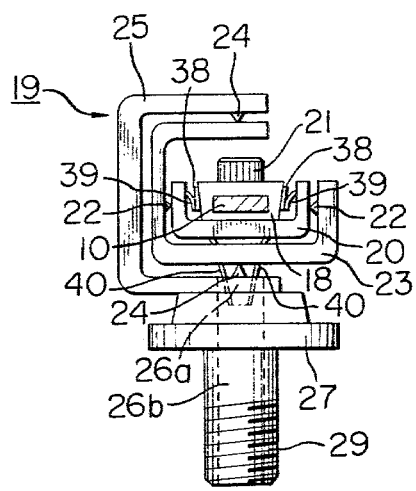
FIG. 5(A) is a schematic left-side view thereof.
Figure 5B:
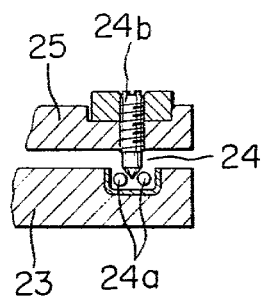
FIGS. 5(B) and (C) show the mounting of outer and inner gimbals.
Figure 5C:
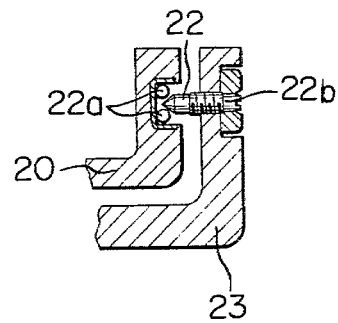
FIG. 5(D) shows the electrical connection between the inner gimbal and an arm main body.
Figure 5D:
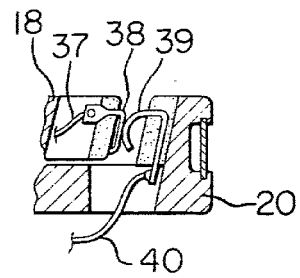

Referring further to FIG. 4, the electrical connection of the cartridge 12 will be described. Four lead wires 37 are extended from connection terminals 36, which are detachably connected to the output terminals (not shown) of the cartridge 12, in for example a groove formed in the lower surface of the arm main body 10 and are connected to four connector terminals 38 two of which are mounted on each side surface of the mounting portion 18 as best shown in FIG. 4. Connection terminals 39 are mounted on the inner surfaces of the vertical legs of the inner supporting frame or the inner gimbal 20 so that they may be brought into electrical and resilient contact with the corresponding connection terminals 38 of the arm main body 10 (See FIG. 5(D)) when the latter is mounted on the inner supporting frame or the inner gimbal 20 in the manner described above. As best shown in FIG. 5(D), lead wires 40 are extended from the connection terminals 39 through a hole formed through the inner supporting frame or the inner gimbal 20 and a hole formed through the outer supporting frame or the outer gimbal 23 into the aligned holes 26a and 26b of the stationary supporting frame or the yoke 25 and the base 27 and are connected to connection terminals or pins (not shown) attached to the lower end of the hole 26b of the base 27. These terminals or pins are connected to an intermediate connector 41 (See FIG. 3) which in turn is connected through a cable 41a to an amplifier (not shown).

The balance weight 15 may be displaced in either direction as described above in order to balance the cartridge 12 correctly even when the weight of the cartridge varies from one to another in a relatively small range. However, when the replaced cartridge 12 cannot be correctly balanced by the displacement of the weight 15, the arm with a suitable weight capable of balancing the cartridge must be used.

What is claimed is:
1. A pickup arm device comprising
   (a) a rotary bearing adapted to be mounted on a record player, said bearing comprising an arm base, a first bearing gimbal fixed to said arm base, a second bearing gimbal mounted on said first bearing gimbal for rotation about a vertical axis, and an arm supporting inner gimbal mounted on said second bearing gimbal for rotation about a horizontal axis,
   (b) an arm main body detachably mounted on said inner gimbal, said arm main body having a cartridge mounting shell at one end thereof and a balance weight for controlling stylus pressure at the other end thereof, said inner gimbal being attached to said arm main body at a position between said cartridge mounting shell and said weight and relatively proximate to said weight,
   (c) an intermediate connector for delivering output signals from a pickup cartridge mounted to said cartridge mounting shell to said record player, said intermediate connector having an output terminal and being mounted on the portion of the arm main body attached to said inner gimbal, said connector being adapted to be connected to said pickup cartridge and a delivering terminal attached to said inner arm gimbal and adapted to be connected to a circuit of said record player, said terminals being slidably electrically connected to each other at a region including said horizontal axis; and
   (d) a lock nut for detachably securing the attached portion of said arm main body to said inner gimbal; whereby said arm main body is freely mounted on and easily removable from said inner gimbal by said lock nut without disassembling said bearing gimbals.

2. A pickup arm device as set forth in claim 1, wherein the delivering terminal and the output terminal constituting said intermediate connector comprise resilient means for urging said terminals toward each other.

3. A pickup arm device as set forth in claim 1 wherein said second bearing gimbal is partly cut off so that said arm main body may be detachably mounted on said inner gimbal through the cut-off portion of said second bearing gimbal.

* * * * *